United States Patent [19]

Kubiatowicz

[11] 4,214,515

[45] Jul. 29, 1980

[54] DISPOSABLE STRUCTURE FOR USE IN MICROWAVE COOKING

[76] Inventor: James F. Kubiatowicz, 1630 Rice Creek Rd., Minneapolis, Minn. 55432

[21] Appl. No.: 14,307

[22] Filed: Feb. 21, 1979

[51] Int. Cl.² ............................................. A47J 37/00
[52] U.S. Cl. ..................................... 99/400; 99/425; 99/446; 219/10.55 E; 426/243
[58] Field of Search ................. 99/400, 422, 425, 444, 99/446, 451, DIG. 14; 426/242, 243; 126/390; 219/10.55 E

[56] References Cited

U.S. PATENT DOCUMENTS

| | | | |
|---|---|---|---|
| 166,120 | 7/1875 | Malin | 99/422 |
| 411,670 | 12/1889 | McCaughey | 99/446 |
| 1,301,197 | 4/1919 | Tully | 99/446 |
| 3,113,505 | 12/1963 | Keppler | 99/425 |
| 3,224,357 | 12/1965 | Rubens | 99/446 X |
| 3,407,723 | 10/1968 | Varkala | 99/400 X |
| 3,466,998 | 9/1969 | Musgrove | 99/425 |
| 3,587,445 | 6/1971 | Kircher | 99/400 |
| 3,593,648 | 7/1971 | Walters | 99/400 |
| 3,685,434 | 8/1972 | Harrison | 99/425 |
| 3,713,379 | 1/1973 | Gordy | 99/400 |
| 3,717,083 | 2/1973 | Karapetian | 99/445 |
| 3,747,506 | 7/1973 | Beigard | 99/425 |
| 3,946,187 | 3/1976 | MacMaster | 99/DIG. 14 |
| 3,994,212 | 11/1976 | Wong | 99/444 |
| 4,112,833 | 9/1978 | Oda | 99/425 |
| 4,121,510 | 10/1978 | Frederick | 99/425 |
| 4,140,889 | 2/1979 | Mason | 99/444 |

*Primary Examiner*—Billy J. Wilhite
*Attorney, Agent, or Firm*—William L. Huebsch

[57] ABSTRACT

A structure for cooking in a microwave oven strips of food such as bacon that gives off liquid in the cooking process. The structure comprises (1) a nonmetallic base portion having a top surface and a cavity recessed from the top surface of a size adapted to contain the liquid released from the strips; and (2) a nonmetallic support portion defining a narrow support surface positioned directly over the cavity over which the strips of food can be hung as they are cooked so that liquid from the strips drains into the cavity.

8 Claims, 9 Drawing Figures

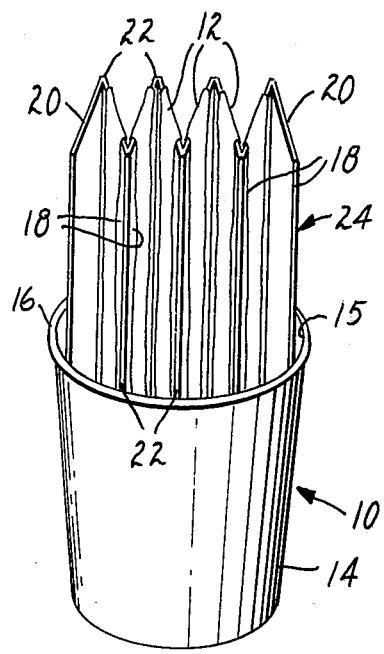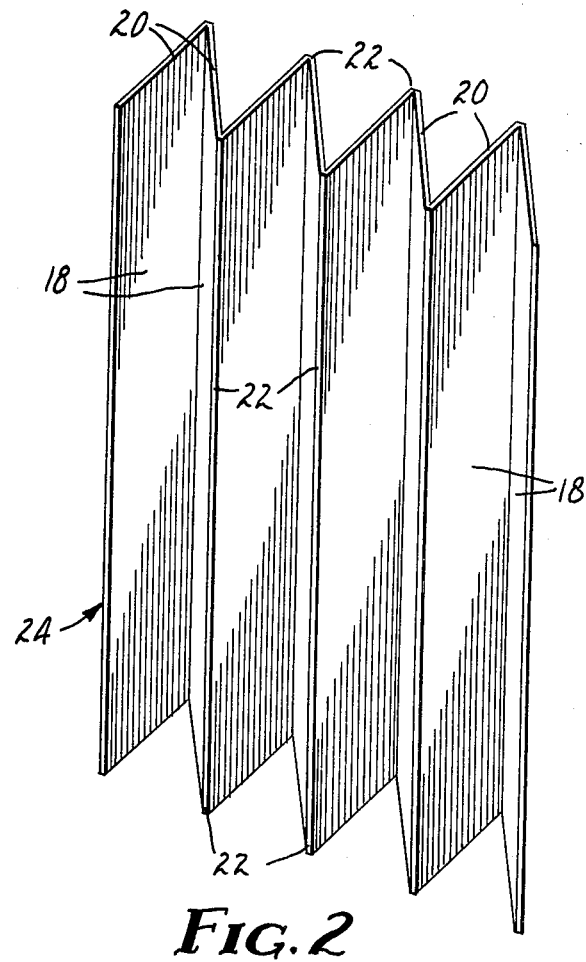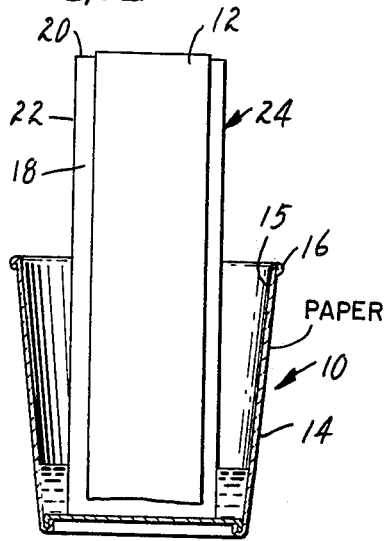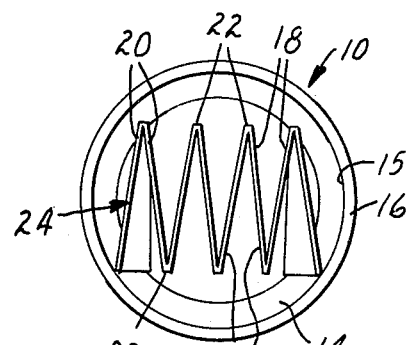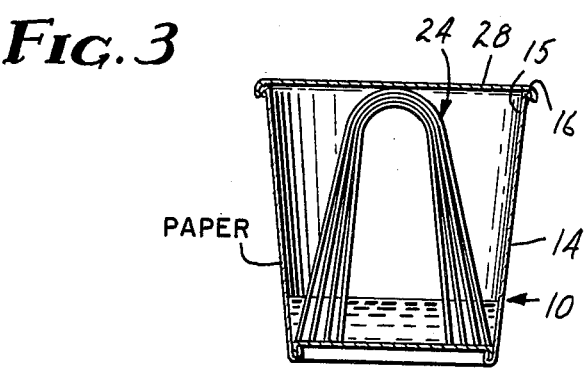

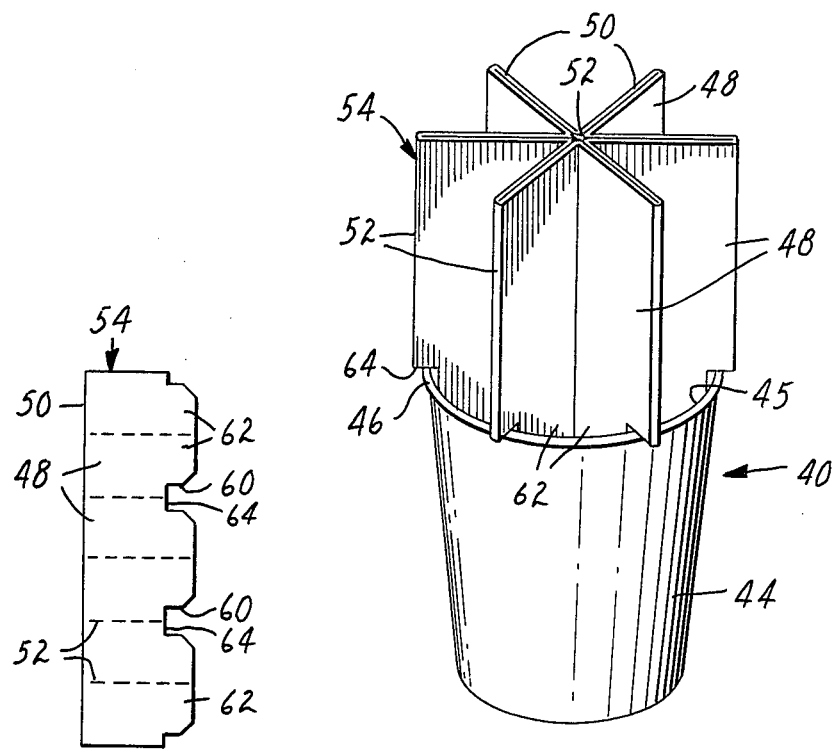
FIG. 6
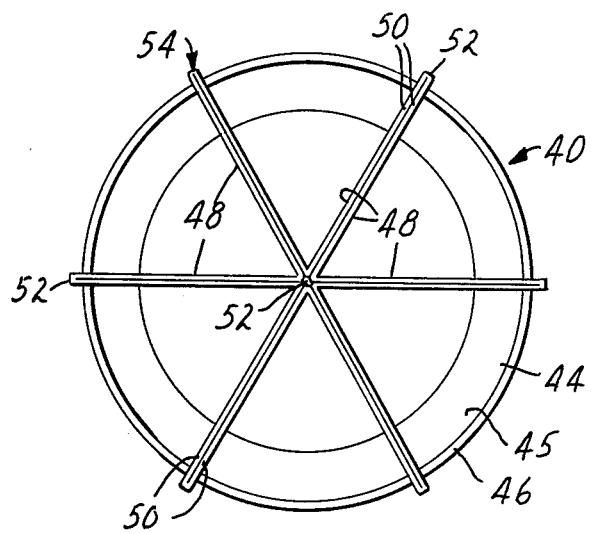
FIG. 9
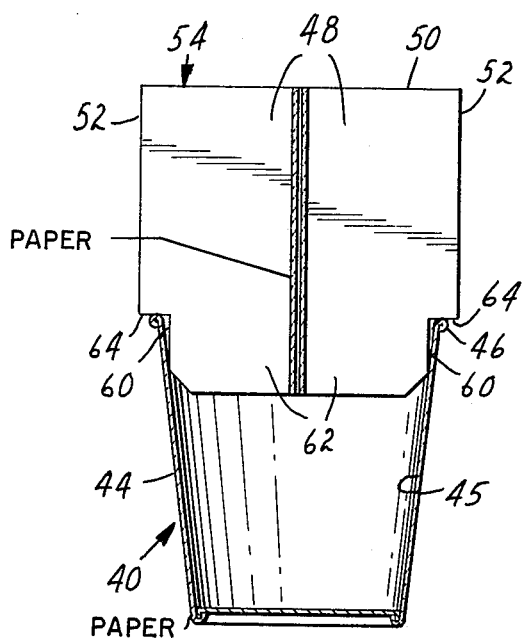
FIG. 8
FIG. 7

DISPOSABLE STRUCTURE FOR USE IN MICROWAVE COOKING

BACKGROUND OF THE INVENTION

While microwave ovens provide a fast, efficient means for cooking, they present certain problems when they are used to cook strip- like food such as bacon which gives off liquid such as grease while it is being cooked. The liquid must be collected, and the microwave cooking process can cause grease to fly onto the inside surfaces of the oven. Thus one method recommended by microwave oven manufacturers for cooking bacon has been to position the bacon between layers of paper towels on a paper plate during cooking so that the paper towels will contain and absorb the grease. This method is time consuming and messy to use, however, and results in an unsightly mass of grease-soaked paper towels that must be disposed of. While trays having channels in their surfaces leading to a reservoir along one edge have also been provided to try to manage the liquids resulting from cooking bacon in a microwave oven, these do not provide the level of protection that may be desired against splattering grease, and they must be emptied of liquid and cleaned for reuse, which is a time-consuming and messy process.

SUMMARY OF THE INVENTION

The present invention provides a disposable structure for cooking in a microwave oven strips of food such as bacon that gives off liquid in the cooking process, which structure is convenient and easy to use, restricts splattering of grease against the oven surfaces during the cooking process, and affords very easy cleanup and disposal of the liquid after the strips of food have been cooked.

According to the present invention, there is provided a structure comprising (1) a nonmetallic base portion having a top surface and a cavity recessed from the top surface of a size adapted to at least contain liquid released from the strips; and (2) a plurality of nonmetallic support portions defining narrow support surfaces and parallel edges disposed at right angles to the support surfaces. The edges are joined to each other to form a pleated assembly adapted to be shaped by folding it at creases or perforations defining the edges and to be supported on the base portion with the narrow support surfaces generally horizontal, positioned directly over the cavity, and spaced from the bottom of the cavity at a distance of at least about one half of the length of the strip material. To use the assembly. the strips of food are hung over the support surfaces of the support portions (which may be done before or after the pleated assembly is mounted on the base portion) so that with the pleated structure mounted on the base portion, the end portions of the strips will be generally vertically disposed and will extend toward the cavity. When the assembled structure and strips of food are inserted in the microwave oven and the oven is activated, the liquid released from the cooking strip material will either run down the strips or will impinge upon adjacent strips or parts of the structure and run down into the cavity where it will be collected. The cooked strip material can then be removed and the structure with the collected liquid can be disposed of.

In one embodiment the support portions are joined so that they can form a generally rectangular accordion-pleated assembly adapted to have its end opposite its support surfaces supported at the bottom of the cavity on the base portion; whereas in another embodiment the support portions are joined so that they can be positioned to project radially outwardly around a central axis, and the pleated assembly is adapted to be supported on the top surface of the base portion with the axis generally vertical and disposed centrally in the cavity.

The structure may be made entirely disposable, with the pleated assembly being adapted to be folded and inserted into the cavity with the collected liquid after the structure is used, and the structure including a cap adapted to engage the housing over the cavity to facilitate disposal of the structure and liquids collected therein.

BRIEF DESCRIPTION OF THE DRAWING

The invention will be further described with reference to the accompanying drawing wherein like numbers refer to like parts in the several views, and wherein:

FIG. 1 is a perspective view of one embodiment of a structure according to the present invention for cooking strips of food such as bacon in a microwave oven illustrated with strips of bacon supported thereon;

FIG. 2 is an enlarged perspective view of a plurality of connected support portions for the structure of FIG. 1;

FIG. 3 is a sectional side view of the structure of FIG. 1 showing liquid collected within the structure;

FIG. 4 is a top view of the structure of FIG. 1 but shown without the strips of bacon illustrated in FIG. 1;

FIG. 5 is a sectional view similar to that of FIG. 3, but shown with the support portion folded within a liquid-containing base portion thereof in preparation for disposal of the structure after its use;

FIG. 6 is a perspective view of an alternate embodiment of a structure according to the present invention for cooking strips of food such as bacon in a microwave oven;

FIG. 7 is a sectional side view of the structure of FIG. 6;

FIG. 8 is a top view of the structure of FIG. 1; and

FIG. 9 is a plan view of an assembly of support portions included in the structure of FIG. 6 shown flat before it is folded and assembled onto a base portion included in the structure.

DESCRIPTION OF THE PREFERRED EMBODIMENT

Referring now to FIGS. 1 through 5 of the drawing, there is shown a first embodiment of a disposable structure according to the present invention for cooking strips of food or bacon 12 in a microwave oven (not shown), which structure is generally designated by the numeral 10.

The structure 10 comprises a nonmetallic base portion or cup 14 having a cavity 15 recessed from a top surface 16 of the cup 14, which cavity 15 is adapted to at least contain the quantity of hot liquids released from the strips of bacon 12 during cooking; and a plurality of nonmetallic support portions 18 each having a narrow support edge surface 20, and being joined along edges 22 at right angles to their support surfaces 20 to form an assembly 24 adapted to be folded along the edges 22 to form a generally rectangular accordion-pleated assembly 24 adapted to have its end opposite the support surfaces 20 inserted in the cavity 15 and supported on the bottom of the cavity 15. Such folding, insertion and support positions the narrow support edge surfaces 20 (which could be provided by either of the ends of the support portions 18) generally horizontal, spaced apart, directly over the cavity 15, and spaced from the bottom of the cavity 15 at a distance at least one half the length of the strips of bacon 12.

To cook strips of bacon 12, the user first folds the assembly 24 into accordion pleats from a flat form in which it is supplied, and drapes one of the strips of bacon 12 over each of the support portions 18 with about equal length end portions of the strip 12 extending down both sides of the support portion 18. He places the assembly 24 in the cavity 15, positions the assembled structure 10 and bacon 12 in a microwave oven, and activates the oven. During cooking, hot liquids released from the bacon 12 will be retained between the adjacent support portions 18 even if they are propelled away from the bacon surface by the cooking process, and will run down the bacon 12 and support portions 18 into the cavity 15 in the cup 14 where they will be contained. Preferably the support portions 18 at both ends of the accordion-pleated assembly 24 are not used so that they serve only to direct liquids escaping from bacon on the adjacent support portion into the cavity 15. Otherwise liquid might escape the structure 10 from the portions of the bacon 12 on the outer surfaces of these outer support portions 18 that project above the upper surface 16 of the cup 14.

It has been found best to cook the bacon for about $\frac{3}{4}$ minute per slice, check the bacon, and cook again (if needed) for up to another $\frac{1}{4}$ minute per slice. When cooked, the bacon strips are separated with a fork and removed from the pleated assembly 24. The structure 10 with its collected liquid can then be conveniently disposed of by folding the pleated assembly 24 in half, inserting it in the cavity 15 with the liquid, and closing the cup 14 with a formed polymeric cap 28 of a known type adapted to make liquid-tight engagement around the top surface 16 of the cup 14 (FIG. 5).

The cup 14 is of the type adapted to contain liquids at the temperatures developed in a microwave oven. The size of the cup 14 should be sufficient to contain all of the liquid released from at least the normal amount of bacon cooked for a family meal, and preferably should contain that liquid in less than about one half its volume to restrict spillage of the liquid when the cup is inadvertently tipped during use. Such a cup is the No. 9746 16-ounce cup available from the American Can Co. which is about 3-$\frac{7}{8}$ inch high, about 2-$\frac{7}{8}$ inch diameter at its base, and about 3-$\frac{5}{8}$ inch diameter at its top surface 16.

The support portions 18 are preferably of 15 point solid bleached oil- and grease-resistant paper carton stock, about two inches wide by about six inches tall, and formed from one piece of such stock about six inches by sixteen inches square which is creased and perforated to provide eight support portions 18. The six-inch height and two-inch width for the support portions 18 have been found suitable for most commercially packaged bacon.

Referring now to FIGS. 6 through 9 of the drawing, there is shown a second embodiment of a disposable structure 40 according to the present invention for cooking strips of food or bacon in a microwave oven in generally the same manner as described above for the structure 10.

The structure 40 comprises a nonmetallic base portion or cup 44 identical to the cup 14 of the structure 10, having a cavity 45 recessed from a top surface 46 of the cup 44, which cavity 45 is adapted to at least contain the quantity of hot liquids released from the strips of bacon during cooking; and a plurality of nonmetallic support portions 48 of the same material as the support portions 18 of the structure 10. The support portions 48 are joined along edges 52 to form an assembly 54 (FIG. 9) adapted to be folded along the edges 52 to form a pleated assembly 54 (FIGS. 6, 7 and 8) defining narrow support surfaces 50 at right angles to their joined edges 52, and an end opposite the support surfaces 50 adapted to be inserted in the cavity 45 and to be supported on the cup 44. Such folding, insertion and support positions the narrow support surfaces 50 generally horizontal, spaced apart, directly over the cavity 45, and spaced from the bottom of the cavity 45 at a distance at least one half the length of the strips of bacon 12 so that strips of bacon to be cooked can be hung across the support surfaces 50 over the cavity 45.

The assembly 54 consists of an even number of support portions 48 (twelve as illustrated) each attached to two adjacent support portions 48 along its opposite parallel edges 52 to form a continuous series of support portions 48. The assembly 54 can be bent along the edges 52 to change the shape of the assembly 54 from flat (FIG. 9) to the pleated shape shown in FIGS. 6, 7 and 8 in which pairs of the support portions 48 are in face-to-face contact, project radially outwardly from a central axis, and are evenly, angularly spaced from adjacent pairs of support portions 48 around the axis. In that configuration, edge surfaces of the support portions 48 disposed at 90 degrees to their edges 52 provide the narrow support surfaces 50 over which the strips of bacon 12 may be hung. Also, each support portion 48 is formed with a notch 60 defining, when the assembly 54 is folded to the shape shown in FIGS. 6, 7 and 8, radially disposed parts 62 of the support portions 48 adapted to enter the cavity 45 and center the axis of the assembly 54 on the cavity 45 and vertically disposed, and radially projecting surfaces 64 adapted to engage and support the assembly 54 on the top surface 46 of the cup 44.

During cooking of bacon on the structure 40 most of the splattering grease will be retained between the pair of support portions 48 over which the bacon is hung and the two pairs of support portions 48 flanking it so that the grease will run down into the cavity 45.

After the structure 40 is used to cook bacon, the pairs of support portions 48 can be revolved around the axis until all of the support portions 48 are aligned in a stack, whereupon the stack of support portions 48 may be inserted into the cavity 45 with the collected liquid, and a cap (like the cap 28 shown in FIG. 5) may be applied to the cup 44 to facilitate neat disposal of the structure 40.

I claim

1. A structure adapted for cooking in a microwave oven strips of food such as bacon that give off liquids in the process, said structure comprising:

a nonmetallic base portion having a top surface and a cavity recessed from said top surface of a size adapted to at least contain liquid released from the strips; and a plurality of nonmetallic support portions having narrow support surfaces and parallel edges disposed at right angles to their support surfaces and joined to each other along said parallel edges to form an assembly adapted to be folded along said edges into a pleated assembly and to be supported on said base portion with said narrow support surfaces generally horizontal and positioned over and spaced from the bottom of the cavity at a distance of at least about one half the length of the strips of food so that strips of food may be hung over said support surfaces with their end portions generally vertically disposed and extending toward said cavity to cause liquid released in the cooking process to be directed into and contained in said cavity.

2. A structure according to claim 1 wherein said pleated assembly includes one of the support members at each of its ends which is attached along only one edge disposed at a right angle to its support surface, and support members between said support members at its ends which are attached along two edges disposed at a right angle to their support surfaces, and said pleated assembly is adapted to have its end opposite said support surfaces supported at the bottom of said cavity in said base portion.

3. A structure according to claim 1 wherein said support members in said pleated assembly may be positioned to project radially outwardly from a central axis, and said pleated assembly is adapted to be supported on said base portion with said axis generally vertically disposed and centered in said cavity.

4. A structure according to claim 3 wherein said pleated assembly is adapted to have its end portion opposite said support surfaces supported on the top surface of said base portion.

5. A structure according to claims 1, 2, or 3 wherein said pleated assembly is adapted to be folded and inserted into said cavity after use, and said structure includes a cap adapted to releasably engage said housing over said cavity to facilitate disposal of said structure and liquids contained therein.

6. A structure adapted for cooking in a microwave oven strips of food such as bacon that give off liquids in the cooking process, said structure comprising:
a nonmetallic base portion having a top surface and a cavity recessed from said top surface of a size adapted to at least contain liquid released from the strips; and
a plurality of nonmetallic support portions having narrow support surfaces and parallel edges disposed at right angles to their support surfaces and joined to each other along said parallel edges in a pleated assembly adapted to be supported on said base portion with said narrow support surfaces generally horizontal and positioned over and spaced from the bottom of the cavity at a distance of at least about one half the length of the strips of food so that strips of food may be hung over said support surfaces with their end portions generally vertically disposed and extending toward said cavity to cause liquid released in the cooking process to be directed into and contained in said cavity.

7. A structure according to claim 6 wherein said pleated assembly includes one of the support members at each of its ends which is attached along only one edge disposed at a right angle to its support surface, and support members between said support members at its ends which are attached along two edges disposed at a right angle to their support surfaces, and said pleated assembly is adapted to have its end opposite said support surfaces supported at the bottom of said cavity in said base portion.

8. A structure according to claim 6 wherein said support members in said pleated assembly are positioned to project radially outwardly from a central axis, and said pleated assembly is adapted to be supported on said base portion with said axis generally vertically disposed and centered on said cavity.

* * * * *